United States Patent [19]

Boyama

[11] 4,407,246
[45] Oct. 4, 1983

[54] IGNITION SIGNAL GENERATING DEVICE FOR USE IN CONTACTLESS IGNITION SYSTEM

[75] Inventor: Kimihiro Boyama, Sunto, Japan

[73] Assignee: Kokusan Denki Co., Ltd., Numazu, Japan

[21] Appl. No.: 252,055

[22] Filed: Apr. 8, 1981

[30] Foreign Application Priority Data

Apr. 11, 1980 [JP] Japan .................................. 55-47780
Apr. 25, 1980 [JP] Japan .................................. 55-55119

[51] Int. Cl.$^3$ ............................................... F02P 5/04
[52] U.S. Cl. ..................................... 123/415; 123/418; 123/421
[58] Field of Search ..................... 123/417, 415, 418

[56] References Cited

U.S. PATENT DOCUMENTS

| 4,164,204 | 8/1979 | Guipaud | 123/418 |
| 4,164,926 | 8/1979 | Kindlmann | 123/418 |
| 4,284,046 | 8/1981 | Hashimoto | 123/415 |
| 4,292,942 | 10/1981 | Katada | 123/415 |

FOREIGN PATENT DOCUMENTS

49-7624 1/1974 Japan .................................. 123/418

*Primary Examiner*—Ronald B. Cox
*Attorney, Agent, or Firm*—Pearne, Gordon, Sessions, McCoy, Granger & Tilberry

[57] ABSTRACT

This invention pertains to an ignition signal generating device for use in a contactless ignition system for an internal combustion engine and more particularly to an ignition signal generating device to control an ignition position in accordance with a revolution of the internal combustion engine.

The ignition signal generating device comprises a first signal generating circuit to generate a first signal at a first position corresponding to the maximum advanced position of the internal combustion engine and a second signal generating circuit to generate a second signal at a second position corresponding to the minimum advanced position of the internal combustion engine. A first triangular wave generating circuit is provided which generates a first triangular wave having a given inclination rising during the period from the first signal generating position to the second signal generating position. A first monostable multi-vibrator is triggered by the second signal to generate a square wave signal of a given duration $\tau_1$. A second triangular wave generating circuit is provided which generates a second triangular wave having a given inclination rising during the period from a falling position of an output from the monostable multi-vibrator at least to the first signal generating position. The maximum value of the triangular wave is maintained until the second signal is generated.

An ignition signal generating circuit is provided which produces an ignition signal to determine an ignition position of the internal combustion engine when the signal levels of first and second triangular wave are equal to each other.

6 Claims, 10 Drawing Figures

IGNITION SIGNAL GENERATING DEVICE FOR USE IN CONTACTLESS IGNITION SYSTEM

BACKGROUND OF THE INVENTION

Of late, to clean an exhaust gas from an internal combustion engine, an ignition position of the internal combustion engine is required to be controlled at optimum. In case that an ignition system for the internal combustion engine is of contactless type, an ignition signal generating device for the ignition system is provided with an electronic advancing circuit. A conventional ignition signal generating device has a disadvantage of no possibility of optionally determining the advance width of the ignition position and also a disadvantage of a complicated construction of the ignition signal generating circuit because of a revolution detector required.

Even a complicated characteristic is required in which the ignition position is advanced in phase in a two stepped manner relative to the revolution of the internal combustion engine. However, such a complicated characteristic cannot be obtained by the conventional ignition signal generating device.

SUMMARY OF THE INVENTION

Accordingly, it is a principal object of the invention to provide an ignition signal generating device for use in a contactless ignition system for an internal combustion engine in which a construction is simplified without any revolution detector and an advanced width is more easily set.

It is another object of the invention to provide an ignition signal generating device for use in a contactless ignition system for an internal combustion engine in which an ignition position can be precisely controlled with a simpler construction.

It is a further object of the invention to provide an ignition signal generating device for use in a contactless ignition system for an internal combustion engine in which a complicated characteristic such as two stepped advance characteristic can be obtained.

In accordance with the invention, there is provided an ignition signal generating device for use in a contactless ignition system for an internal combustion engine comprising;

a first signal generating circuit to generate a first signal at a first position corresponding to the maximum advanced position of said internal combustion engine;

a second signal generating circuit to generate a second signal at a second position corresponding to the minimum advanced position of said internal combustion engine;

a first triangular wave generating circuit to generate a first triangular wave having a given inclination rising during the period from the first signal generating position to the second signal generating position;

a monostable multi-vibrator triggered by said second signal to generate a square wave signal of given duration $\tau_1$;

a second triangular wave generating circuit to generate a second triangular wave having a given inclination rising during the period from a falling position of an output of said monostable multi-vibrator at least to said first signal generating position with the maximum value of said triangular wave being maintained until said second signal is generated;

and an ignition signal generating circuit to produce an ignition signal to determine an ignition position of said internal combustion engine when the signal levels of first and second triangular wave are equal to each other.

BRIEF DESCRIPTION OF THE DRAWINGS

The above and other objects and features of the invention will be apparent from the description of an embodiment of an ignition signal generating device constructed in accordance with the invention taken with reference with the accompanying drawings in which;

FIGS. 7E' to 7I' show waveforms of signals generated at portions E to I of FIG. 5 over a middle speed of revolution range;

DETAILED DESCRIPTION OF THE EMBODIMENTS

Figure 1:
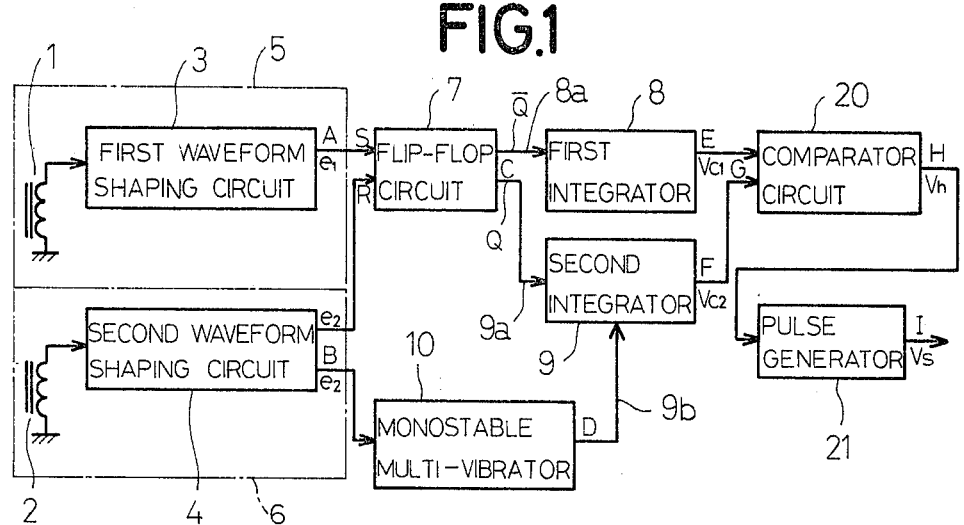
FIG. 1 is a block diagram of an embodiment of an ignition signal generating device constructed in accordance with the invention.

Referring now to FIG. 1, there is shown an ignition signal generating device of the invention. The ignition signal generating device comprises first and second signal coils 1 and 2 which generate signals in synchronism with rotation of an internal combustion engine. The first and second signal coils 1 and 2 are provided in a signal generator on the engine.

The first signal coil 1 generates a first signal at a first position $\theta_1$ corresponding to the maximum advanced position at which an ignition phase is most advanced relative to the top dead point of the engine, and the second signal coil 2 generates a second signal at a second position $\theta_2$ corresponding to the minimum advanced position at which the ignition phase is advances most nearly relative to the top dead point of the engine.

Outputs from the first and second signal coils 1 and 2 are supplied to first and second waveform shaping circuits 3 and 4, respectively, to be converted into first and second signals $e_1$ and $e_2$ in the form of pulse.

The first signal coil 1 and the first waveform shaping circuit 3 constitute a first signal generating circuit 5 to generate the first signal $e_1$ at the first position. The second signal coil 2 and the second waveform shaping circuit 4 constitute a second signal generating circuit 6 to generate the second signal $e_2$ at the second position.

The first and second signals $e_1$ and $e_2$ are supplied to a set terminal S and a reset terminal R of a RS flip-flop circuit 7, respectively. An output terminal $\bar{Q}$ of the flip-flop circuit 7 is connected to a control terminal $8a$ of a first integrator 8 as a first triangular wave generating circuit. An output terminal Q is connected to a first control terminal $9a$ of a second integrator 9 as a second triangular wave generating circuit. The second signal $e_2$ is supplied to a triggering terminal of a monostable multi-vibrator 10, an output from which is supplied to a second control terminal $9b$ of the second integrator 9.

The first integrator 8 makes an integrating operation by charging a capacitor $C_1$ (not shown in FIG. 1) with a constant current $i_1$ during the period for which the output terminal $\bar{Q}$ of the flip-flop circuit 7 is kept at "0" (from the time when the first signal $e_1$ is generated to the time when the second signal $e_2$ is generated). The second integrator 9 initiates an integrating operation in which a capacitor $C_2$ (not shown in FIG. 1) is charged with a constant current $i_2$, when the output from the monostable multi-vibrator 10 varies from "1" to "0" during the period for which the output Q of the flip-flop circuit 7 is "0", and stops the integrating operation when the flip-flop circuit 7 is set by the first signal $e_1$ so that the output Q thereof becomes "1". The second integrator 9 has such a storing function that the integrated value when the integrating operation is stopped is maintained until the second integrator is reset. The second integrator 9 is reset when the output of the monostable multi-vibrator 10 becomes "1" by means of the second signal $e_2$ and again initiates the integrating operation when the output of the monostable multi-vibrator falls to "0".

First and second triangular waves $V_{c1}$ and $V_{c2}$ at the output terminals of the first and second integrators 8 and 9 are supplied to and compared by a comparator circuit 20. When the levels of the triangular waves $V_{c1}$ and $V_{c2}$ are equal to each other, the comparator circuit 20 produces a signal Vh and, at that time, a pulse generator 21 generates an ignition signal Vs to determine the ignition position of the internal combustion engine. An ignition signal generating circuit which generates an ignition signal when the outputs of the first and second integrators are equal to each other is formed by the comparator circuit 20 and the pulse generator 21.

FIGS. 2A to 2I show waveforms of the signals at the portions A to I of FIG. 1 relative to the rotating angle $\theta$ of a crank shaft of the engine. As noted from these figures, the first and second signal generating circuits 5 and 6 generate the first and second signals $e_1$ and $e_2$ at the positions $\theta_1$ and $\theta_2$ as shown in FIGS. 2A and 2B. The flip-flop circuit 7 generates the signal of "1" at the output terminal Q during the period from the time when the first signal $e_1$ is generated to the time when the second signal $e_2$ is generated (the period between $|\theta_1$ and $\theta_2|$). A signal which inverts the signal at the output terminal Q is obtained at the output terminal $\bar{Q}$. The monostable multi-vibrator 10 is triggered by the second signal $e_2$ to generate a square wave signal of given width $\tau_1$ as shown in FIG. 2D. The duration $\tau_1$ of the square wave signal is constant regardless of the revolution of the engine, and therefore, the falling position $\theta_3$ of the square wave signal varies on the revolution of the engine.

The first integrator 8 is operated while the flip-flop circuit 7 is generating the signal of "0" at the output terminal $\bar{Q}$ thereof. When the output of terminal Q of the flip-flop circuit 7 becomes "1", the operation of the first integrator 8 is stopped and an integrating capacitor discharges according to a given time constant. Thus, at the output terminal of the first integrator 8 is obtained a triangular wave $V_{c1}$ which rises with a given inclination during the period from the angle $\theta_1$ to $\theta_2$ and falls with an another given inclination by discharging the capacitor at the angle $\theta_2$.

The second integrator 9 initiates to be operated as shown in FIG. 2F when the output of the monostable multu-vibrator 10 varies from "1" to "0" at the angle $\theta_3$. The integrating operation of the second integrator 9 is stopped when the output of the terminal Q of the flip-flop circuit 7 rises to "1" at the angle $\theta_1$. The integrated value is maintained until the second integrator 9 is reset. The second integrator 9 is reset when the output of the terminal Q of the flip-flop circuit 7 falls to "0" on generation of the second signal $e_2$. Thus, at the output terminal of the second integrator is obtained a second triangular wave which rises linearly during the period from the angle $\theta_3$ to $\theta_1$ and maintains the maximum value during the period from the angle $\theta_1$ to $\theta_2$ as shown in FIG. 2F.

The first triangular wave $V_{c1}$ from the first integrator 8 and the second triangular wave $V_{c2}$ from the second integrator 9 are compared by the comparator circuit 20 as shown in FIG. 2G. When the signal levels of the first and second triangular waves are equal to each other at the angle $\theta_i$, the comparator 20 generates a square wave signal Vh which is maintained while the triangular wave level $V_{c1}$ is equal to or higher than the second triangular wave level $V_{c2}$ as shown in FIG. 2H. The pulse generator 21 generates the ignition signal Vs at a rising portion of the square wave signal Vh. The ignition signal operates the contactless ignition system not shown.

The contactless ignition system which is connected to the aforementioned ignition signal generating device may be in arbitrary form. It may be of capacitor discharging type in which a charged ignition capacitor discharges through a thyristor turned on by the ignition signal and through a primary coil portion of an ignition coil, or may be of current interrupting type in which a current flowing through an exciting coil and a primary coil portion of an ignition coil is rapidly shorted from the primary coil portion by a semiconductor switch such as transistor connected in parallel to the exciting coil and turned on by the ignition signal.

Figure 2:
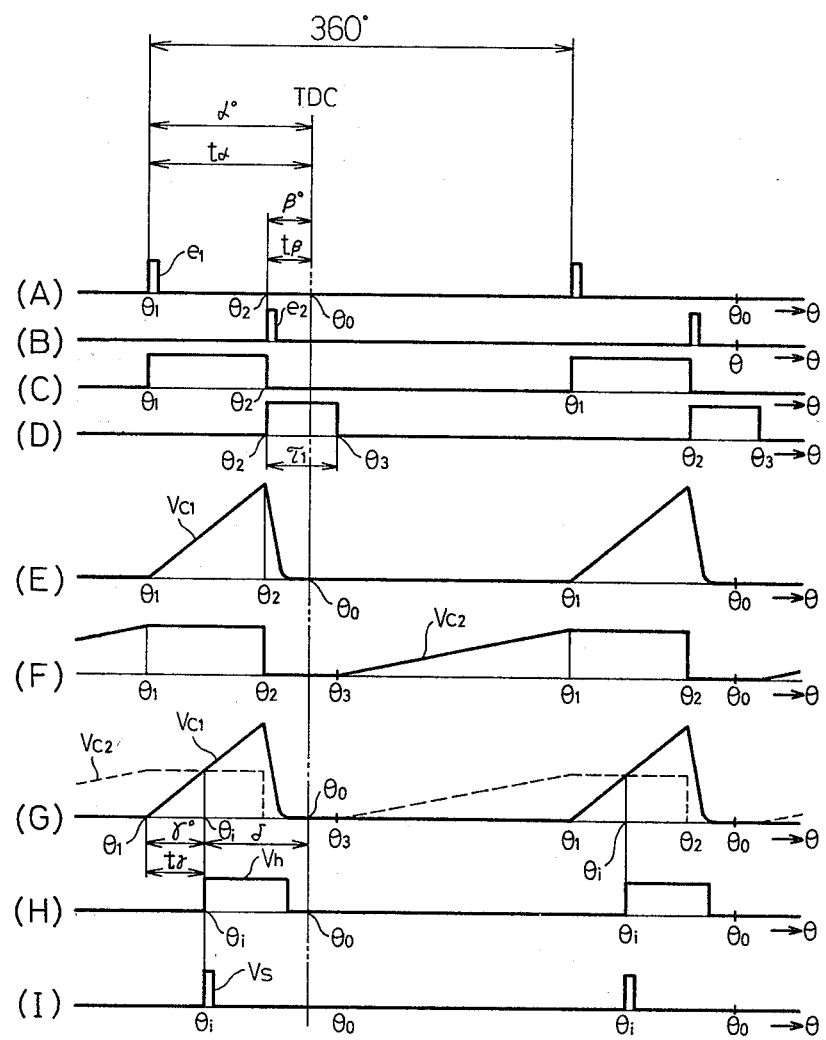
FIGS. 2A to 2I show waveforms of signals generated at portions of the device of the invention.

In FIG. 2, let it be supposed that the angle $\theta_0$ is the top dead point, $\alpha_0$ is the angle at which the first signal $e_1$ is generated, relative to the angle $\theta_0$, $\beta°$ is the angle at which the second signal $e_2$ is generated and $t_\alpha$ and $t_\beta$ are the period during which the engine is rotated from the angle $\theta_1$ to $\theta_0$ and from the angle $\theta_2$ to $\theta_0$. Also, let it be supposed that $\gamma°$ is the angle from the angle $\theta_1$ to $\theta_i$ (the ignition position) at which the outputs from the first and second integrators are equal to each other and $t_\gamma$ is the period during which the engine rotates to the angle $\gamma°$. The voltage across the capacitor $C_2$ of the first integrator 8 at the ignition position $\theta_i$ is;

$$V_{c1} = (i_1/C_1)t_\gamma \qquad (1)$$

and the voltage across the capacitor $C_2$ of the second integrator at the angle $\theta_i$ is;

$$V_{c2} = (i_2/C_2)\{(60/N) - t_\alpha + t_\beta - \tau_1\} \qquad (2)$$

wherein N (rpm) is speed of revolution of the engine. Since $V_{c1}$ is equal to $V_{c2}$ at the angle $\theta_i$, the period during which the engine rotates at speed of revolution N (rpm) from the angle $\theta_1$ to $\theta_i$ is;

$$t_\gamma = (C_1 i_2 / i_1 C_2)\{(60/N) - t_\alpha + t_\beta - \tau_1\} \qquad (3)$$

The period $t_\gamma$ can be rewritten by the following angle $\gamma°$;

$$\gamma = (C_1 i_2 / i_1 C_2)(360° - \alpha + \beta - 6N\tau_1) \qquad (4)$$

The angle (advanced angle) $\delta$ from the top dead point $\theta_o$ to the ignition position $\theta_i$ is expressed as follows;

$$\begin{aligned}\delta &= \alpha - \gamma = \alpha - (C_1 i_2 / i_1 C_2)(360° - \alpha \\ &+ \beta - 6N\tau_1) = \alpha\{1 + (C_1 i_2 / i_1 C_2)\} \\ &- (C_1 i_2 / i_1 C_2)(360° + \beta) + 6N\tau_1 (C_1 i_2 / i_1 C_2)\end{aligned} \qquad (5)$$

wherein if $\delta \equiv K_1 + K_2 N$ $$K_1 = \alpha\{1 + (C_1 i_2 / i_1 C_2)\} - (C_1 i_2 / i_1 C_2)(360° + \beta) \qquad (6)$$

$$K_2 = 6\tau_1(C_1 i_2 / i_1 C_2) \qquad (7)$$

As noted from this, as the speed of revolution of the engine increases, the ignition position $\theta_i$ is advanced, and it can be controlled relative to the speed of revolution by varying a constant $K_2$. Thus, it will be noted that various advance characteristics can be obtained by varying the duration $\tau_1$ of the output signal from the monostable multi-vibrator.

Although, in the above description, the integrated value of the second integrator 9 is maintained between the angles $\theta_1$ and $\theta_2$, the second integrator may be integrally operated to the angle $\theta_2$. This causes the ignition position to be advanced relative to the speed of revolution of the engine.

Figure 3:
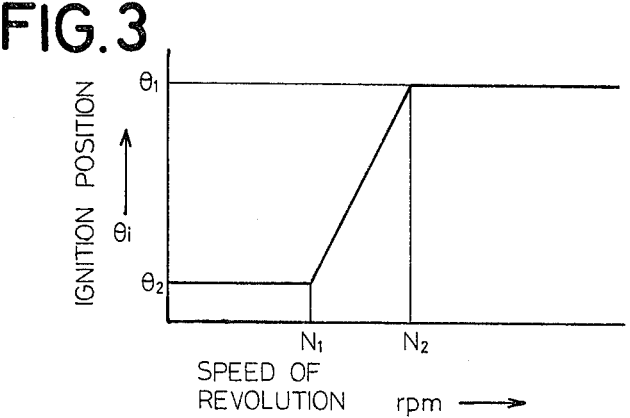
FIG. 3 shows an example of an advance characteristic obtained in accordance with the embodiment of FIG. 1.

In the embodiment of FIG. 1, if the output voltage across the second integrator is so set as to be higher than that of the first integrator at low speed of the engine, the outputs of the first and second integrators are necessarily equal to each other at the angle $\theta_2$ and the output voltage across the first integrator is higher than that of the second integrator until the capacitor of the first integrator is completed to be discharged (reset) from the angle $\theta_2$. Therefore, from the comparator circuit 20 is obtained the square wave signal Vh which is maintained until the capacitor of the first integrator is completed to be dischaeged from the angle $\theta_2$. Then, the angle $\theta_i$ is equal to the angle $\theta_2$ at the low speed, and the ignition operation is made at the angle $\theta_2$. If the speed of revolution increases, the output voltage from the second integrator (the voltage which is maintained between the angles $\theta_1$ and $\theta_2$) decreases. Thus, the ignition position is advanced along the slope of the output from the first integrator. As the ignition position is advanced until the angle $\theta_i$ is equal to the angle $\theta_1$, the output voltages from the first and second integrators cannot be compared. At that time, the first signal $e_1$ may be used as the ignition signal so that it is supplied to the ignition system. This allows the ignition operation to be made at the angle $\theta_1$. Therefore, in this case, the advance characteristic is as shown in FIG. 3.

Figure 4:
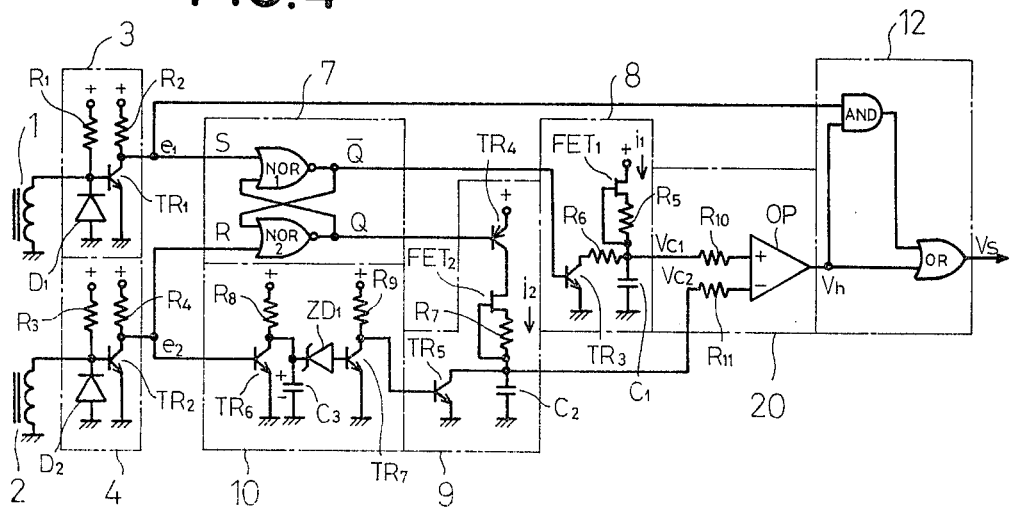
FIG. 4 is a schematic diagram of a detailed embodiment of FIG. 1.

FIG. 4 shows the embodiment of FIG. 1 in more detail. The waveform shaping circuit 3 may comprise a transistor $TR_1$, a diode $D_1$ and resistors $R_1$ and $R_2$. When a voltage is established across the first signal coil 1 so that the earth side of the coil 1 becomes positive, a current flowing through the resistor $R_1$ to the base of the transistor $TR_1$ is transferred so as to be directed to the first signal coil 1. Therefore, the transistor $TR_1$ is turned off and at that time the first signal $e_1$ is generated as shown in FIG. 2A. The waveform shaping circuit 4 may comprise a transistor $TR_2$, a diode $D_2$ and resistors $R_3$ and $R_4$ in the same manner as the waveform shaping circuit 3. The flip-flop circuit 7 may comprise two NOR circuits $NOR_1$ and $NOR_2$ in a conventional manner. The first integrator 8 may comprise a constant current source comprising a field effect transistor $FET_1$ and a resistor $R_5$, an integrating capacitor $C_1$ and a reset circuit for discharging the capacitor $C_1$ which consists of a transistor $TR_3$ and a resistor $R_6$. During the period between the angles $\theta_1$ and $\theta_2$ during which the output of terminal Q of the flip-flop circuit 7 is in the condition of "0", the transistor $TR_3$ remains nonconductive to charge the capacitor $C_1$ with a constant current $i_1$. When the output of terminal $\overline{Q}$ of the flip-flop circuit 7 becomes "1" at the angle $\theta_2$, the transistor $TR_3$ is turned on so that the integrating operation is stopped and the capacitor $C_1$ discharges according to a given time constant. Thus, the output voltage of the first integrator across the capacitor $C_1$ is in the form of triangular wave as shown in FIG. 2E.

The second integrator 9 may comprise a transistor $TR_4$ to be conducted when the output of terminal Q of the flip-flop circuit 7 is maintained at "0", a constant current source comprising a field effect transistor $FET_2$ and a resistor $R_7$, an integrating capacitor $C_2$ and a resetting transistor $TR_5$. When the transistor $TR_5$ is in the nonconductive condition, as the transistor $TR_4$ is turned on, the capacitor $C_2$ is charged with a constant current $i_2$ to initiate the integrating operation of the second integrator.

The monostable multi-vibrator 10 may comprise transistors $TR_6$ and $TR_7$, a capacitor $C_3$, a Zener diode $ZD_1$ resistors $R_8$ and $R_9$. The base of the transistor $TR_6$ is connected to the collector of the transistor $TR_2$ while the collector of the transistor $TR_7$ is connected to the base of the transistor $TR_5$. In the monostable multi-vibrator, the capacitor $C_3$ is charged by a not shown DC source through the resistor $R_8$ with the polarities shown. The base current flows through the Zener diode $ZD_1$ to the transistor $TR_7$, which causes the latter to be conducted. On this condition, when the base of the transistor $TR_6$ has the second signal $e_2$ applied thereto, the transistor $TR_6$ is turned on to rapidly discharge the capacitor $C_3$. Therefore, the current from the DC source through the resistor $R_8$ flows through the capacitor $C_3$. This causes the transistor $TR_7$ to be turned off so that the potential of the collector thereof becomes increased. The transistor $TR_6$ is returned to the nonconductive condition when the second signal $e_2$ is extinguished and then the capacitor $C_3$ is charged according to a given time constant. When the voltage across the capacitor $C_3$ exceeds the Zener voltage of the Zener diode $ZD_1$ at the angle $\theta_3$, the transistor $TR_7$ is turned on so that the potential at the collector thereof is decreased. Accordingly, the potential at the collector of the transistor $TR_7$ (the output terminal of the monostable multi-vibrator) is "1" during the period between the angles $\theta_2$ and $\theta_3$ as shown in FIG. 2D. As the result, the transistor $TR_5$ is turned on during the period between the angles $\theta_2$ and $\theta_3$ so that the second integrator is maintained in the reset condition. When the output of the monostable multi-vibrator becomes "0" at the angle $\theta_3$, the transistor TR$_5$ is turned off. At that time, as a potential at the output terminal Q of the flip-flop circuit 7 is "0" and the transistor TR$_4$ is conductive, the capacitor C$_2$ of the second integrator 9 is charged so that the voltage across the capacitor C$_2$ rises as shown in FIG. 2F. When the potential at the output terminal Q of the flip-flop circuit 7 becomes "1" at the angle $\theta_1$, the transistor TR$_4$ is turned off and as a result the integrating operation is stopped. Since the transistor TR$_5$ is nonconductive during the period between the angles $\theta_1$ and $\theta_2$ because the output of the monostable multi-vibrator 10 is "0", the voltage (integrated value) across the capacitor C$_2$ remains as it is.

The comparator circuit 20 may comprise an operational amplifier OP and resistors R$_{10}$ and R$_{11}$. The comparator circuit generates the square wave signal Vh continuing while the integrated value of the first integrator 8 exceeds that of the second integrator 9 as shown in the FIG. 2F.

The ignition signal generating circuit 21 may comprise an AND circuit AND and an OR circuit OR. The signal Vh is supplied to one of input terminals of the AND circuit AND and also to one of input terminals of the OR circuir OR. Another input terminal of the AND circuit AND has the first signal e$_1$ applied thereto while an output terminal of the AND circuit AND is connected to another input terminal of the OR circuit. To obtain the advance characteristics as shown in FIG. 3, the ignition signal Vs is supplied from the comparator 20 through the OR circuit OR in case of N≦N$_2$. In case of N>N$_2$, "AND" of the AND circuit AND is established at the maximum advanced position $\theta_1$ and the ignition signal Vs is applied through the AND and OR circuits. In FIG. 4, terminals "+" are connected to the positive terminal of the DC source.

Although, in the above embodiment, the integrators of the capacitors to be charged with a constant current are used to generate two triangular waves, there may be used a first triangular wave generating circuit and a second triangular wave generating circuit, both of which are of other type. The first triangular wave generating circuit is required to generate the first triangular wave rising with given slope during the period between the maximum advanced position $\theta_1$ and the minimum advanced position $\theta_2$ and the second triangular wave generating circuit is required to generate the second triangular wave rising with given slope during the period from the angle $\theta_3$ at which the output of the monostable multi-vibrator falls at least to the maximum advanced position $\theta_1$ and maintaining the maximum value until the minimum advanced position $\theta_2$ is reached. In this case, the second triangular wave circuit may generate the triangular wave rising continuously during the period between the angles $\theta_3$ and $\theta_2$, as aforementioned.

Figure 5:
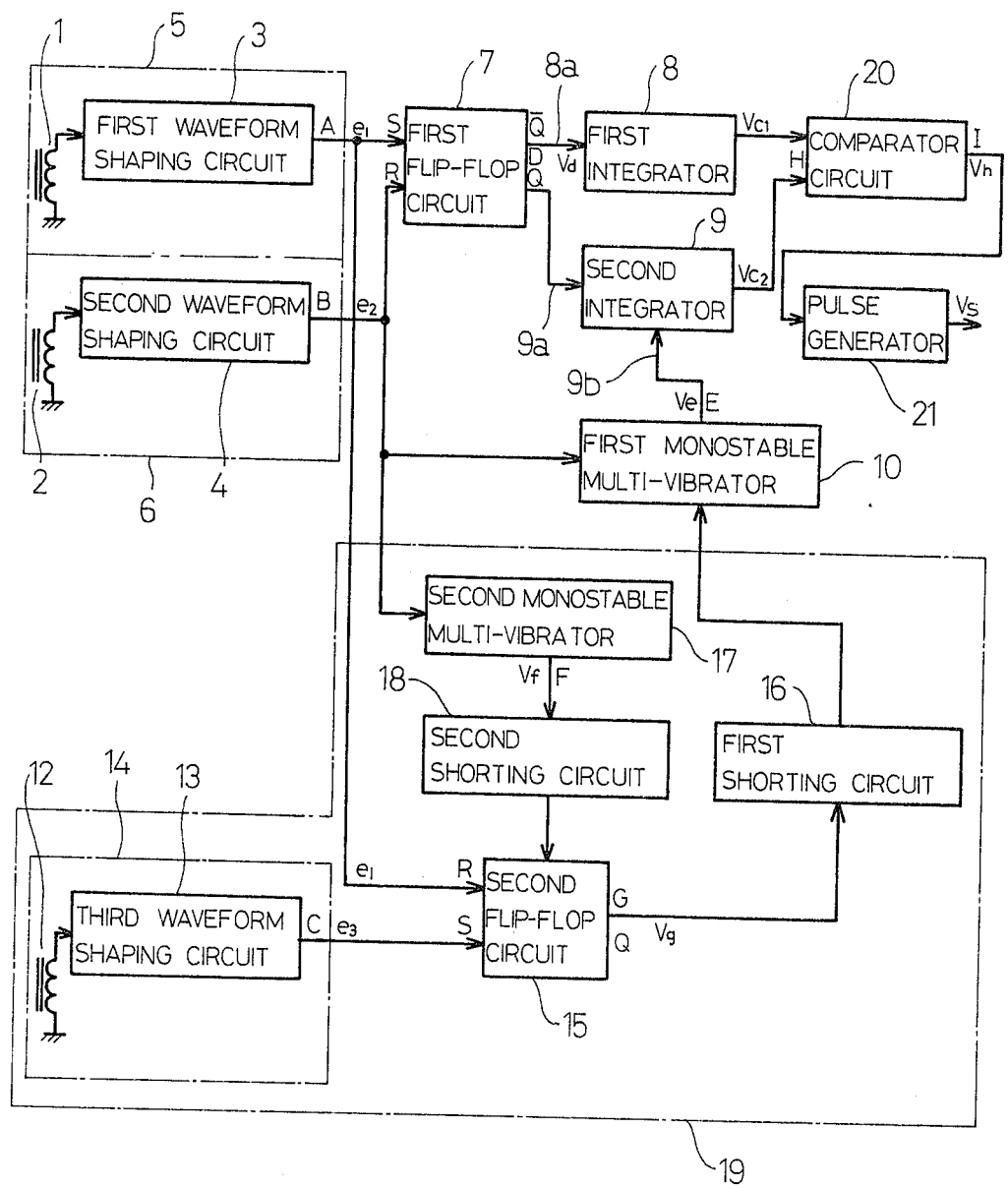
FIG. 5 is a block diagram of another embodiment of an ignition signal generating device constructed in accordance with the invention.

FIG. 5 shows another embodiment of the invention in which the same components have the same numerals attached thereto. In the embodiment of FIG. 5, there is further provided a duration control circuit 19 to control a duration of the monostable multi-vibrator 10, but other construction is substantially identical to that of the embodiment of FIG. 1. In the embodiment, the flip-flop circuit 7 is called the first flip-flop circuit and the monostable multi-vibrator 10 is called the first monostable multi-vibrator.

The duration control circuit 19 comprises a third signal coil 12 to generate a third signal at a third position $\theta_3$ which is more delayed in phase than the second position $\theta_2$ at which the second signal generating circuit 6 generates the second signal e$_2$. The third signal coil is provided in the signal generator in the same manner as the first and second signal coils. The output of the third signal coil 12 is supplied to a third waveform shaping circuit 13 to be converted into the third signal e$_3$ of pulse. A third signal generating circuit 14 comprises the third signal coil 12 and the third waveform shaping circuit 13. The third signal e$_3$ is applied to a set terminal S of a second RS flip-flop circuit 15, a reset terminal R of which has the first signal e$_1$ applied thereto. The output of the second flip-flop circuit 15 is supplied to a first shorting circuit 16 which shorts the output of the first monostable multi-vibrator 10 while the potential at the output terminal Q of the second flip-flop circuit 15 remains "1". A second monostable multi-vibrator 17 is triggered by the second signal e$_2$ and the output of the second monostable multi-vibrator is supplied to a second shorting circuit 18. The second shorting circuit 18 shorts the output of the second flip-flop circuit 15 during the duration $\tau_2$ while the output of the monostable multi-vibrator 17 remains "1".

The triangular waves V$_{c1}$ and V$_{c2}$ obtained from the first and second integrators 8 and 9 are compared by the comparator circuit 20. When the signal levels of the triangular waves are equal to each other, the comparator 20 generates the signal Vh and then the pulse generator 21 generates the ignition signal Vs to determine the ignition position.

Figure 6:
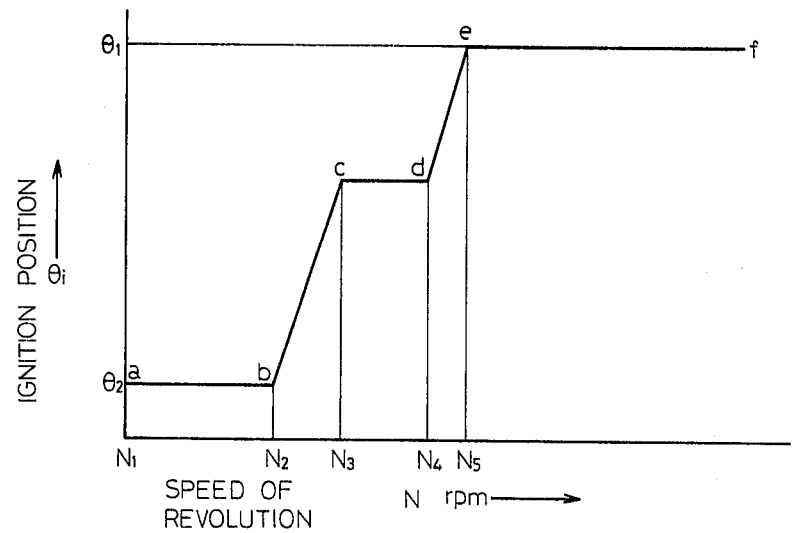
FIG. 6 shows an advance characteristic obtained in accordance with the embodiment of FIG. 5.
Figure 7:
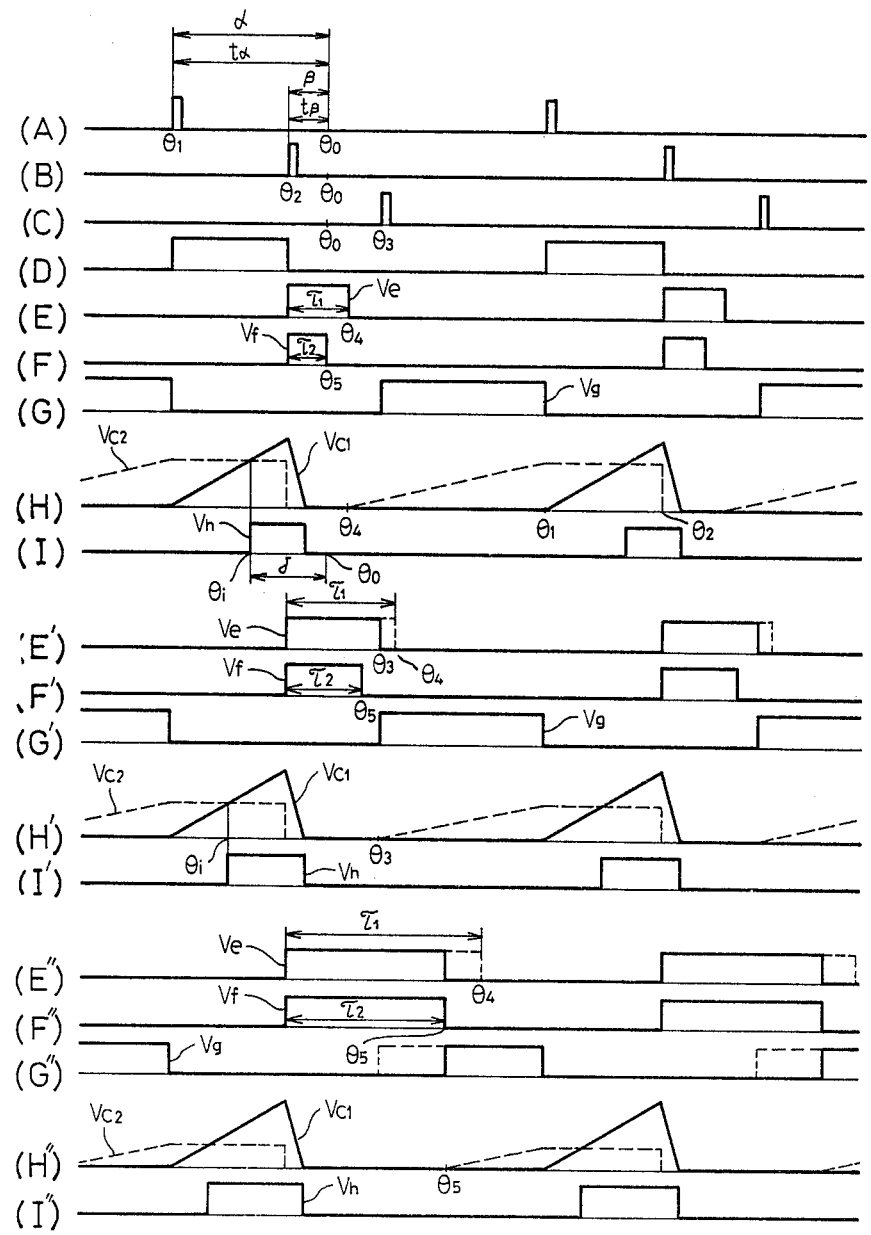
FIGS. 7A to 7D show waveform of signals generated at portions a to d of FIG. 6.
FIGS. 7E to 7I show waveforms of signals generated at portions E to I of FIG. 5 over a range from a low speed of revolution to a middle speed of revolution of the engine, respectively.

In the embodiment of FIG. 5, the signal waveforms at the portions A to C are shown in FIGS. 7A to 7C. In case of advance characteristic of FIG. 6, let it be supposed that N$_0$ (rpm) indicates a speed of revolution when the engine is idling, N$_1$ (rpm) a first setting speed of revolution when a first stepped advance begins, N$_2$ (rpm) a second setting speed of revolution when the first stepped advance terminates, N$_3$ (rpm) a third setting speed of revolution when a second stepped advance begins, and N$_4$ (rpm) a fourth setting speed of revolution when the second stepped advance terminates. The signal waveforms at the portions E to I of FIG. 5 over the range between N$_0$ and N$_2$ are as shown in FIGS. 7E to 7I. The signal waveforms at the portions E to I over the range between N$_2$ and N$_3$ are as shown in FIGS. 7E' to 7I', and the signal waveforms at the portions E to I over the range between N$_3$ and N$_4$ are as shown in FIGS. 7E'' to 7I''. In FIG. 7, there is indicated a rotating angle of the engine at a horizontal axis.

In the embodiment of FIG. 5, the first and second signal generating circuits 5 and 6 generate the first and second signals e$_1$ and e$_2$ at the first and second positions $\theta_1$ and $\theta_2$ as shown in FIGS. 7A and 7B and the third signal generating circuit 14 generates the third signal e$_3$ at the third position $\theta_3$ as shown in FIG. 7C. The first flip-flop circuit 7 generates the signal Vd (a first period signal) of "1" at the output terminal Q thereof during the period ($|\theta_1-\theta_2|$) from the time when the first signal e$_1$ is $|\theta_1-\theta_2|$ generated to the time when the second signal e$_2$ is generated as shown in FIG. 7D. At the output terminal Q of the flip-flop circuit 7 is obtained the signal (a second period signal) which inverts the signal at the output terminal Q. The first monostable multi-vibrator 10 is triggered by the second signal e$_2$ to output the square wave signal V$_e$ of duration $\tau_1$ as shown in FIG. 7E. The duration $\tau_1$ of the signal is constant regardless of the speed of revolution of the engine and as a result the falling position $\theta_4$ of the square wave signal Ve varies on the speed of revolution. The second monostable multi-vibrator 17 is also triggered by the second signal $e_2$ to output the square wave signal of duration $\tau_2$ ($<\tau_1$) as shown in FIG. 7F. The second flip-flop circuit 15 is reset by the third signal $e_3$ to output the signal Vg of "1" until it is set by the first signal $e_1$.

The first integrator 8 is integrally operated while the output of terminal $\overline{Q}$ of the first flip-flop circuit 7 remains at "0" and stops the operation when the output of terminal Q becomes "1" and then the integrating capacitor $C_1$ discharges according to a given time constant. Thus, at the output terminal of the first integrator 8 is obtained the first triangular wave $V_{c1}$ rising with a given inclination during the period between the angles $\theta_1$ and $\theta_2$ and falling with a given inclination from the angle $\theta_2$ as shown in FIG. 7. The second integrator 9 begins to be integrally operated as shown in FIG. 7H when the output of the first monostable multi-vibrator 10 becomes "0" at the angle $\theta_4$. The second integrator 9 terminates its operation when the potential at the output of the first flip-flop circuit 7 is rising to "1" at the angle $\theta_1$. The integrated value of the integrator 9 is maintained until it is reset. The second integrator 9 is reset when the potential at the output terminal Q of the flip-flop circuit 7 falls to "0" by the second signal $e_2$ generated. Thus, at the output terminal of the second integrator is obtained the second triangular $V_{c2}$ rising linearly during the period between $\theta_4$ and $\theta_1$ and being maintained at the maximum value during the period between $\theta_1$ and $\theta_2$ as shown in FIG. 7H. The first and second triangular waves $V_{c1}$ and $V_{c2}$ from the first and second integrators are compared by the comparator circuit 20 as shown in FIG. 7H. When the levels of the triangular waves become equal to each other at the angle $\theta_i$, the comparator circuit 20 generates the square wave signal Vh continuing while $V_{c1} \geq V_{c2}$ is maintained from the time when the angle $\theta_1$ is reached, as shown in FIG. 7I. The pulse generator 21 generates the ignition signal Vs when the signal Vh rises.

In the above embodiment, it will be described later how the ignition position $\theta_i$ varies on the speed of revolution of the engine.

(1) The speed of revolution N being $\geq N_0$ and $\leq N_2$.

In this case, the falling position $\theta_4$ of the output of the first monostable multi-vibrator 10 never reaches the rising position $\theta_3$ (the third signal generating position) of the output Vg of the second flip-flop circuit 15. Therefore, the output of the first monostable multi-vibrator 10 is never shorted by the first shorting circuit 16 and the duration $\tau_1$ of the output of the first monostable multi-vibrator 10 never varies. In this revolution range, the falling position $\theta_5$ of the output of the second monostable multi-vibrator 17 never reaches the falling position $\theta_3$ of the output of the second flip-flop circuit 15. As a result, the output of the second flip-flop circuit 15 is never shorted by the second shorting circuit 18. Therefore, the duration of the output of the second flip-flop circuit 15 never varies. Furthermore, when the speed of revolution N is $\geq N_0$ and $\leq N_1$, the output voltage of the second integrator 9 is higher than that of the first integrator 8. On the other hand, when the speed of revolution N is $>N_1$, the output voltage of the first integrator 8 is higher than that of the second integrator 9.

As aforementioned, in case N is $\geq N_0$ and $\leq N_2$, the first and second shorting circuits 16 and 18 are in the inoperative condition, which causes the duration control circuit 19 to be inoperative. Thus, it will be noted that the operation in this revolution range is substantially identical to that of the embodiment of FIG. 1 and that the advance characteristic is identical to that of FIG. 3 as shown by a-b-c in FIG. 6.

(2) The speed of revolution N being $>N_2$ and $\leq N_3$.

In this revolution range, the angle $\theta_4$ corresponding to the termination of the duration $\tau_1$ of the output of the first monostable multi-vibrator 10 is more delayed than the rising position $\theta_3$ of the output of the second flip-flop circuit 15. Therefore, the portion of the output Ve of the first monostable multi-vibrator 10 more delayed than the angle $\theta_3$ is shorted by the first shorting circuit 16 as indicated by a dotted line of FIG. 7E'. The duration $\tau_2$ of the output Vf of the second monostable multi-vibrator 17 is shorter than the duration $\tau_1$ of the output Ve of the first monostable multi-vibrator 10 and in the revolution range of N being $\geq N_2$ and $\leq N_3$, the termination of the duration $\tau_2$ does not reach the termination of the period $\tau_1$. Therefore, the duration of the output Vg of the second flip-flop circuit 15 never varies as shown in FIG. 7G'. Thus, the falling position of the output Ve of the first monostable multi-vibrator 10 is always the angle $\theta_3$ and the operation initiating position of the second integrator 9 is always the angle $\theta_3$. In this manner, the angle $\theta_i$ at which the output signals of the first and second integrators are equal to each other is constant and the advancing operation is paused as indicated by a linear line c-d of FIG. 6.

(3) The speed of revolution N being $>N_3$.

In this revolution range, the falling position $\theta_5$ of the output of the second monostable multi-vibrator 17 is more delayed than the third signal generating position $\theta_3$ as shown in FIG. 7F''. Therefore, the portion of the output of the second flip-flop circuit 15 between the angles $\theta_3$ and $\theta_5$ is shorted by the second shorting circuit 18 with the output of the second monostable multi-vibrator 17, as shown in FIG. 7G''. Thus, the duration of the output of the first monostable multi-vibrator 10 is equal to $\tau_2$ as shown in FIG. 7E'' and the angle at which the second integrator 9 begins to be operated is $\theta_5$ as shown in FIG. 7H''. In this revolution range, $\tau_1$ is equal to $\tau_2$ and the advance characteristic is obtained which depends on the duration $\tau_2$ of the output of the second monostable multi-vibrator 17. As the ignition position $\theta_i$ is advanced until $\theta_i$ is equal to $\theta_i$, the output voltages of the first and second integrators cannot be compared. At that time, the first signal $e_1$ may be supplied as the ignition signal to the ignition system. Thus, it will be noted that the advance characteristic in case of N being $>N_3$ is indicated by d-e-f of FIG. 6.

Figure 8:
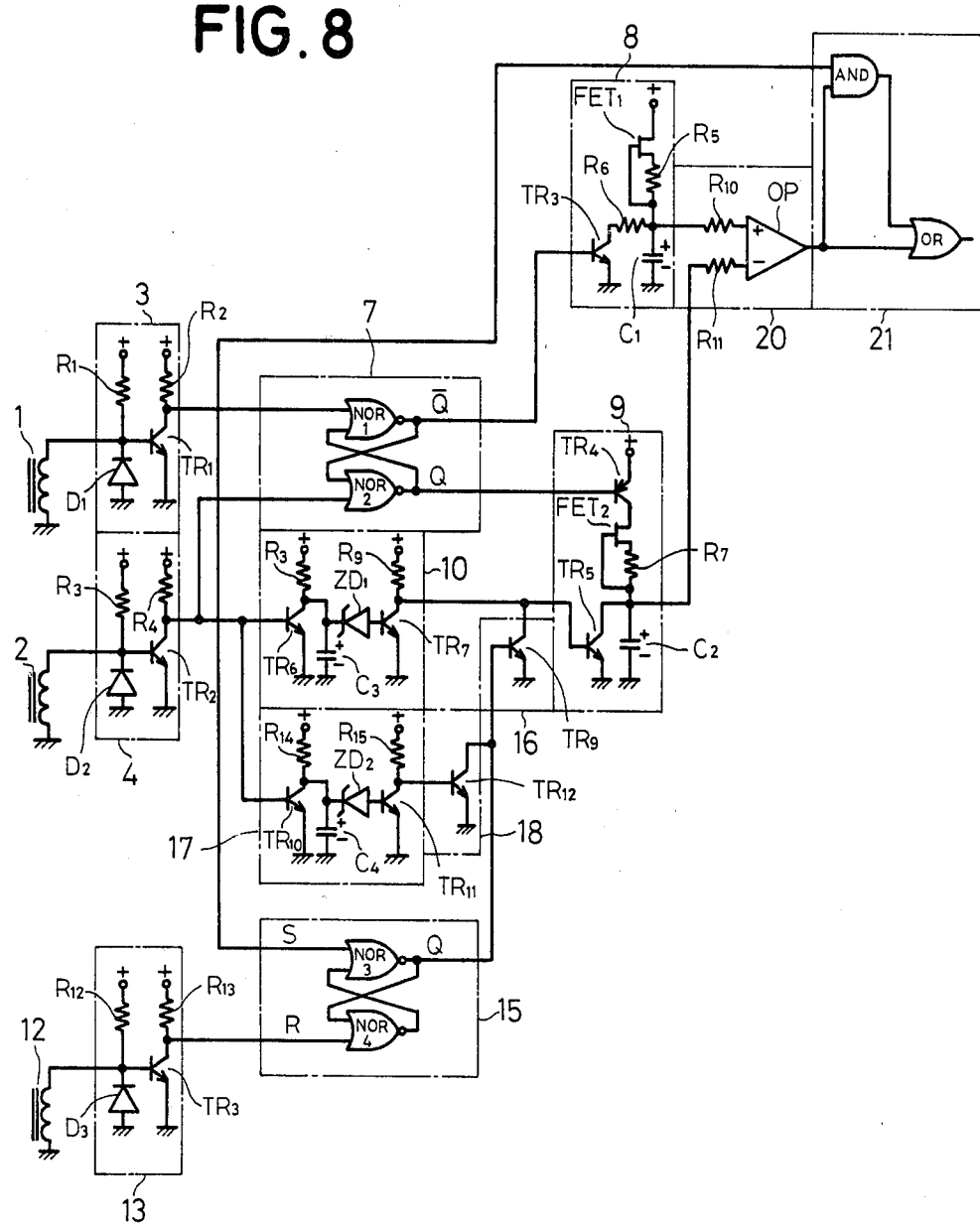
FIG. 8 is a schematic diagram of a detailed embodiment of FIG. 5.

FIG. 8 shows a detailed embodiment of FIG. 5. In this figure, the same components are designated by the same numerals. The device of FIG. 8 is substantially identical to that of FIG. 4, except that there is further provided the duration control circuit which may comprise the third wave shaping circuit 13, the second flip-flop circuit 15, the first shorting circuit 16, the second monostable multi-vibrator 17 and the second shorting circuit 18.

The third wave shaping circuit 13 may comprise a transistor $TR_8$, and diode $D_3$ and resistors $R_{12}$ and $R_{13}$ in the same manner as the first and second wave shaping circuits 3 and 4. The second flip-flop circuit 15 may comprise NOR circuits $NOR_3$ and $NOR_4$. The first shorting circuit 16 may comprise a transistor $TR_9$ with the collector and the base being connected to the collector and the emitter of the transistor $TR_7$ of the first monostable multu-vibrator 10. When the output Q of the second flip-flop circuit 15 is at high potential, the transistor $TR_9$ is turned on to short the output of the first monostable multi-vibrator. The second monostable multi-vibrator 17 may comprise transistor $TR_{10}$ and $TR_{11}$, a Zener diode $ZD_2$, a capacitor $C_4$ and resistors $R_{14}$ and $R_{15}$ in the same manner as the first monostable multi-vibrator 10. The second shorting circuit 18 may comprise a transistor $TR_{12}$ with the collector and the emitter connected across the output terminals of the second flip-flop circuit 15. The base of the transistor $TR_{12}$ is connected to the output terminal of the second monostable multi-vibrator 17. When the second monostable multi-vibrator is generating its output, the transistor $TR_{12}$ is turned on to short the output of the second flip-flop circuit 15.

According to this embodiment, the set revolution $N_2$ at which the advance operation is paused, the set revolution $N_3$ at which the 2-stepped advance operation begins and the inclination of the advance characteristic may vary on the durations $\tau_1$ and $\tau_2$ of the outputs of the first and second monostable multi-vibrators.

Also, the ignition position may be delayed from the set revolution by shortening the duration $\tau_1$ of the output of the first monostable multi-vibrator 10.

Furthermore, the ignition position of the engine may be controlled by changing the duration $\tau_1$ of the output of the first monostable multi-vibrator 10 in accordance with an inhalation negative pressure, an oil temperature of the engine and a car speed. Variation in the duration $\tau_1$ of the output of the first monostable multi-vibrator 10 in accordance with the inhalation negative pressure may be accomplished by cooperating with a diaphragm for detecting the inhalation negative pressure of the engine a variable resistor which is provided in place of the resistor $R_8$ of the monostable multi-vibrator 10.

Figure 9:
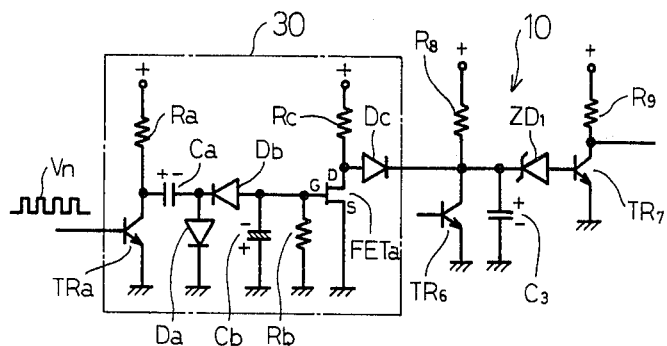
FIGS. 9 and 10 are schematic diagram of additional circuits provided to control the ignition position under various conditions.

A control circuit 30 may be added to the first monostable multi-vibrator 10 as shown in FIG. 9. This can delay the ignition position to limit the speed of revolution of the engine by shortening the duration $\tau_1$ of the output of the monostable multi-vibrator 10 in accordance with an increase in the speed of revolution. In this figure, a transistor TRa is provided which has a pulse voltage Vn of frequency proportional to the speed of revolution applied to the base thereof. The collector of the transistor TRa is connected through a resistor Ra to a DC source. To the collector of the transistor TRa is connected one end of a capacitor Ca, to the other end of which is connected an anode of a diode Da. The cathode of the diode Da is connected to the emitter of the transistor TRa. A capacitor Cb and a resistor Rb are connected in parallel to both ends of the diode Da through a reversely disposed diode Db. A field effect transistor FETa has a gate supplied to the anode of the diode Db. The source of the field effect transistor TRa is grounded to earth together with the emitter of the transistor TRa while the drain of the field effect transistor FETa is connected through a resistor Rc to the DC source and also through a diode Dc to the collector of the transistor $TR_6$ of the monostable multi-vibrator 10. In the circuit of FIG. 9, the transistor TRa is repeatedly turned on and off in accordance with the pulses proportional to the speed of revolution. When the transistor TRa is turned off, the capacitor Ca is charged from the DC source through the resistor Ra and the diode Da with the polarities shown. When the transistor TRa is turned on, the capacitor Ca is charged through the capacitor Cb and the diode Db. At that time, the capacitor Cb is charged with the polarities shown. The capacitor Cb is discharged through the resistor Rb. The voltage across the capacitor Cb increases on charging cycle that is the speed of revolution of the engine. As the voltage across the capacitor Cb increases, the field effect transistor FETa is reversely biased between the gate and source thereof so that the drain current decreases. As a result, the current flowing through the resistor Rc and the diode Dc into the capacitor $C_3$ increases. Accordingly, as the revolution increases, the duration $\tau_1$ of the output of the monostable multi-vibrator 10 is shortened. In this manner, as the revolution reaches certain value, the ignition position is delayed so that the revolution of the engine is restrained.

Figure 10:
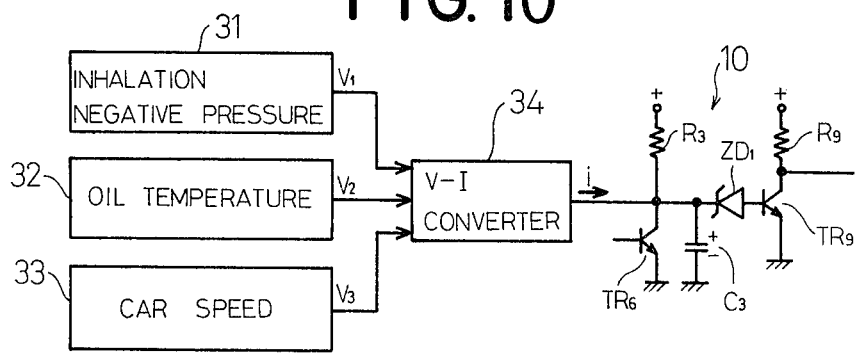

FIG. 10 shows an example in which the ignition position is controlled in accordance with the inhalation negative pressure, the oil temperature of the engine and the car speed. Detectors 31, 32 and 33 generate voltage signals v1, v2 and v3 proportional to the inhalation negative pressure, the oil temperature of the engine and the car speed, respectively. The signals from the detectors are converted by a voltage-current converter (V-I converter) 34 into a current signal i which is supplied to the capacitor $C_3$. With such construction, the duration $\tau_1$ of the output of the first monostable multi-vibrator 10 can vary on the inhalation negative pressure, the oil temperature of the engine and the car speed. Thus, it will be understood that the ignition position can be controlled in accordance with such parameters.

While some preferred embodiments of the invention have been described and illustrated with reference to the accompanying drawings, it will be understood by those skilled in the art that they are by way of example, and that various modifications and changes may be made without departing from the spirit and scope of the invention, which is intended to be defined only to the appended claims.

What is claimed is:

1. An ignition signal generating device for use in a contactless ignition system for an internal combustion engine comprising;

a first signal generating circuit to generate a first signal at a first position corresponding to the maximum advanced ignition position of said internal combustion engine;

a second signal generating circuit to generate a second signal at a second position corresponding to the minimum advanced ignition position of said internal combustion engine;

a first triangular wave generating circuit to generate a first triangular wave having a given inclination rising during the period from the first signal generating position to the second signal generating position;

a monostable multi-vibrator triggered by said second signal to generate a square wave signal of a given duration $\tau_1$;

a second triangular wave generating circuit to generate a second triangular wave having a given inclination rising during the period from a falling position of an output signal of said monostable multi-vibrator at least to said first signal generating position with the maximum value of said triangular wave being maintained until said second signal is generated;

and an ignition signal generating circuit to produce an ignition signal to determine an ignition position of said internal combustion engine when the signal levels of said first and second triangular waves are equal to each other.

2. An ignition signal generating device as set forth in claim 1, and wherein said first triangular wave generating circuit comprises an integrator controlled by an output signal from a flip-flop circuit to initiate an integrating operation after said first position of said first signal generating circuit and to stop the integrating operating at said second position of said second signal generating circuit, said flip-flop circuit being set when said first signal is input and being reset when said second signal is input.

3. An ignition signal generating device as set forth in claim 1, and wherein said second triangular wave generating circuit comprises an integrator controlled by outputs from said flip-flop circuit and said monostable multi-vibrator to initiate an integrating operation after the falling position of the output from said monostable multi-vibrator and to stop the integrating operation at said first position of said first signal generating circuit, the integrated value at that time being maintained until said second position of said second signal generating circuit.

4. An ignition signal generating device as set forth in claim 1 and further comprising a duration control circuit to control the duration of the output signal from said monostable multi-vibrator in accordance with the advance characteristic.

5. An ignition signal generating device for use in a contactless ignition system for an internal combustion engine comprising:
   a first signal generating circuit to generate, a first signal at a first position corresponding to the maximum advanced position of said internal combustion engine;
   a second signal generating circuit to generate a second signal at a second position corresponding to the minimum advanced position of said internal combustion engine;
   a first triangular wave generating circuit to generate a first triangular wave having a given inclination rising during the period from the first signal generating position to the second signal generating position;
   a monostable multi-vibrator triggered by said second signal to generate a square wave signal of a given duration $\tau_1$;
   a second triangular wave generating circuit to generate a second triangular wave having a given inclination rising during the period from a falling position of an output of said monostable multi-vibrator at least to said first signal generating position with the maximum value of said triangular wave being maintained until said second signal is generated;
   an ignition signal generating circuit to produce an ignition signal to determine an ignition position of said internal combustion engine when the signal levels of said first and second triangular wave are equal to each other; and,
   a duration control circuit to control the duration $\tau_1$ of the output signal from said monostable multi-vibrator; said duration control circuit comprising a third signal generating circuit to generate a third signal at a third position corresponding to the position delayed more than said second position; a second monostable multi-vibrator triggered by said second signal to generate a square wave signal of a given duration $\tau_2$; a flip-flop circuit controlled by said first signal from said first signal generating circuit and said third signal from said third signal generating circuit to generate an output during the period from the time when said third signal is generated to the time when said first signal is generated; a first shorting circuit to short the output from said first monostable multi-vibrator during the period during which the output from said flip-flop circuit is generated; and a second shorting circuit to short the output from said flip-flop circuit during the period during which the output from said second monostable multi-vibrator is generated.

6. An ignition signal generating device as set forth in claim 1, and wherein said ignition signal generating circuit comprises a comparator to compare said first triangular wave with said second triangular wave and a pulse generator controlled by an output from said comparator to generate a pulse signal.

* * * * *